(12) United States Patent
Johnson (10) Patent No.: US 9,240,968 B1
(45) Date of Patent: Jan. 19, 2016

(54) AUTOGENERATED EMAIL SUMMARIZATION PROCESS

(71) Applicant: Sprint Communications Company L.P., Overland Park, KS (US)

(72) Inventor: Anthony E. Johnson, Lee's Summit, MO (US)

(73) Assignee: Sprint Communications Company L.P., Overland Park, KS (US)

(*) Notice: Subject to any disclaimer, the term of this patent is extended or adjusted under 35 U.S.C. 154(b) by 137 days.

(21) Appl. No.: 14/179,805

(22) Filed: Feb. 13, 2014

(51) Int. Cl.
| | |
|---|---|
| *G06F 15/16* | (2006.01) |
| *H04L 12/58* | (2006.01) |
| *H04L 12/24* | (2006.01) |
| *H04L 29/12* | (2006.01) |
| *G06Q 10/10* | (2012.01) |

(52) U.S. Cl.
CPC .............. *H04L 51/22* (2013.01); *H04L 41/026* (2013.01); *H04L 41/5093* (2013.01); *G06Q 10/10* (2013.01); *H04L 12/58* (2013.01); *H04L 29/1215* (2013.01)

(58) Field of Classification Search
CPC ... H04L 12/28; H04L 41/026; H04L 41/5093; H04L 29/1215; G06F 2011/006; G06Q 10/10
USPC ................................. 709/206, 207, 224, 230
See application file for complete search history.

(56) References Cited

U.S. PATENT DOCUMENTS

| | | | | | |
|---|---|---|---|---|---|
| 6,052,709 | A | * | 4/2000 | Paul .............................. | 709/202 |
| 2003/0110248 | A1 | * | 6/2003 | Ritche ........................... | 709/224 |
| 2010/0146057 | A1 | * | 6/2010 | Abu-Hakima et al. ....... | 709/206 |
| 2010/0199188 | A1 | * | 8/2010 | Abu-Hakima et al. ....... | 715/733 |
| 2012/0251963 | A1 | * | 10/2012 | Barker ............................ | 432/1 |
| 2013/0254308 | A1 | * | 9/2013 | Rose et al. .................... | 709/206 |

* cited by examiner

*Primary Examiner* — Michael Y Won (57) ABSTRACT

A method of monitoring a plurality of servers is disclosed. The method comprises a centralized provisioning system (CPS) server receiving emails from a plurality of provisioning servers, wherein the emails are auto-generated by the provisioning servers. The method comprises the CPS server transferring the emails to an email account. The method comprises a CPS email process (CEP) server accessing the emails in the email account, wherein the emails are one or more of a variety of emails. The method comprises the CEP server analyzing the emails, wherein the CEP server analyzes the subject, the time stamp, and the source of each email. The method comprises, the CEP server transferring each of the emails to a plurality of lists based on its analysis. The method comprises the CEP server generating a summary email for each list. The method further comprises the CEP server sending the summary emails to a designated recipient.

20 Claims, 5 Drawing Sheets

AUTOGENERATED EMAIL SUMMARIZATION PROCESS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Applications are mounted and executed on a computer that may be referred to as a "server computer." Sometimes, server computers receive and service requests from other applications called clients. Server computers may periodically capture and monitor application system logs for system metrics, e.g. central processing unit (CPU) use, memory use, or communication interface use. Periodically, server computers may generate emails related to logs and metrics and send those emails to another system or a system administrator. These emails that are sent by one system to another may be referred to as logs, notifications, information emails, alarms, etc. Sometimes, these emails may make indication of issues of priority, severity, or importance.

SUMMARY

In an embodiment, an email processing system is disclosed. The system comprises a centralized provisioning system (CPS) server. The CPS server further comprises a processor, a memory, and a CPS application stored in the memory. The CPS application, when executed by the processor of the CPS server, receives emails from a plurality of provisioning servers, wherein the emails are auto-generated by applications executing on the provisioning servers, and transfers the emails to an email account. The system further comprises a CPS email process (CEP) server. The CEP server further comprises a processor, a memory, and a CEP application stored in the memory. The CEP application, when executed by the processor of the CEP server, accesses the emails in the email account, analyzes the emails, and based on the analysis transfers each of the emails to one of a plurality of lists. The emails are one or more of status emails, alert emails, alarm emails, notification emails, log emails, or information emails, and each email comprises a subject, a time stamp, and a source of the email. The CEP application then generates a summary email for each list based on the emails that the list comprises. When a number of emails in a summary associated with a pre-defined subject exceeds a pre-defined threshold, the CEP application commands an action be performed by the provisioning server, wherein the action is one of a reboot, an initiation of a garbage collection utility, a change of allocation of heap memory, or a change of an allowed number of network connections of the provisioning server associated with the summary. The CEP application then sends each of the summary emails to a designated recipient.

In an embodiment, a method of monitoring a plurality of servers is disclosed. The method comprises receiving emails from a plurality of provisioning servers by a centralized provisioning system (CPS) server, wherein the emails are auto-generated by applications executing on the provisioning servers. The method further comprises transferring the emails to an email account by the CPS server. The method further comprises a CPS email process (CEP) server accessing the emails in the email account, wherein the emails are one or more of status emails, alert emails, alarm emails, notification emails, log emails, or information emails and wherein each email comprises a subject, a time stamp, and a source of the email. The method further comprises the CEP server analyzing the emails in the email account, wherein the CEP server analyzes the subject of the emails, the time stamps of the emails, and the source of the emails. The method further comprises the CEP server transferring each of the emails to one of a plurality of lists, based on the analysis. The method further comprises the CEP server generating a summary email for each list based on the emails that the list comprises. The method further comprises the CEP server sending each of the summary emails to a designated recipient.

In an embodiment, a method of monitoring a plurality of server computers is disclosed. The method comprises a monitoring application of a monitoring server analyzing emails in an email account, wherein the emails are from a plurality of server computers, wherein the emails comprise information about statuses of the server computers that sent the emails or statuses of applications that execute on the server computers that sent the emails. The method further comprises the monitoring application transferring each of the emails to one of a plurality of lists. The method further comprises the monitoring application generating a summary email for each list based on the emails that the list comprises. The method further comprises the monitoring application sending each of the summary emails to a designated recipient.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure provides a system and methods for an email processing system. Prior to the implementation of a centralized provisioning system (CPS) email process (CEP) server that generates summary emails, employees of companies that preside over systems of servers may receive hundreds if not thousands of emails in a short amount of time depending in part on the number of servers they preside over or the number of issues that occur for those servers. Reading that many emails and addressing issues based on that many emails could prove to make work both inefficient and tedious. With the CEP server, the number of emails and the amount of time spent reading emails by employees that preside over systems of servers may be lessened as the CEP server organizes emails into lists and generates summary emails for those lists. This system may allow employees to work more efficiently and address issues as they occur more rapidly.

In an embodiment, the system comprises a centralized provisioning system (CPS) server that further comprises a CPS application that receives emails from a plurality of provisioning servers. The provisioning servers may provide activation of mobile communication devices or configuration of mobile communication devices to communicate on a network. In an embodiment, the emails that the CPS application receives comprise one or more of status emails, information emails, notification emails, log emails, alarm emails, alert emails or other kinds of emails. The emails comprise a subject, a time stamp, and a source of the email (e.g., an identity of a provisioning server or other server. In an embodiment, there may be a substantial number of emails received by the CPS application depending on the number of provisioning servers there are or the number of issues that may occur. The CPS application transfers the emails into an email account. In an embodiment, the email account that the emails are transferred to is a group email account that may be accessed by the CPS application or other applications.

The system further comprises a CPS email process (CEP) server which comprises a CEP application that accesses the emails in the email account. In an embodiment, the CEP application accesses the email account about every five minutes or some other interval of time. The CEP application analyzes the emails and based on the analysis of the emails, the CEP application transfers each of the emails from the email account to one of a plurality of lists. In an embodiment, the lists may be organized in part by which server that the emails come from, the subject of the emails, or a plurality of keywords which may indicate a severity status. The CEP application generates a summary email for each list based on the emails that the list comprises. The CEP application then sends each of the summary emails to a plurality of responsible employees, individuals, and/or designated recipients that preside over the provisioning servers. After the plurality of designated recipients receive the summary emails, issues that may have occurred may be addressed accordingly. The CEP application then removes each of the emails from the lists and stores them to an email archive data store. After a period of seven days or some other interval of time, the emails may be deleted from the email archive data store The CEP application may be able to, depending on the issues that occur in the provisioning servers, take action if during the analysis the CEP application notices a pre-defined issue that when found allows the CEP application to reboot the server. The CEP application may send a summary email of important status to the plurality of employees that states that a particular provisioning server has an issue that may be fixed by rebooting the provisioning server. The employees may allow the CEP application to reboot the provisioning server that is having the issue without engaging in a manual fix.

Alternatively, if the CEP application identifies an issue, the CEP application may take action autonomously to correct the issue, for example by rebooting a provisioning server, by initiating a garbage collection cycle or garbage collection utility on the provisioning server, by allocating more or less memory for heap memory on the provisioning server, by adapting the number of allowed network connections of the provision server, and other actions.

It is understood that the CEP application may identify a variety of issues to trigger taking an action, such as an action described above. In an embodiment, the CEP application may trigger taking action when the number of emails associated with a summary exceeds a predefined threshold. The summary may be associated with a predefined subject, for example associated with a memory alarm summary (e.g., a summary of an email list collecting emails related to alarm emails related to memory conditions on a provisioning server, for example an excessive amount of allocated memory or alternatively too little free memory). The summary may be associated with other predefined subjects, for example subjects related to provisioning server memory utilization, provisioning server CPU utilization, provisioning server network connection states, and other subjects.

While one specific embodiment is described above, other embodiments may comprise one or more servers sending one or more of status emails, information emails, notification emails, log emails, alarm emails, and/or alert emails to a single account and an email summarization server that reads the emails from that email account, distributes them to lists, creates summaries of the lists, and sends the summaries to designated recipients. For example, the provisioning servers that are monitored by the CPS server as described above may instead be any kind of server that is capable of sending emails to an email account. The email summarization server, similar in function to the CEP server, may be able to directly access the emails that were sent by the server and process them. For example, the email summarization server may read and transfer emails in the email account to a plurality of lists. The email summarization server may generate a summary of each of the lists (a separate summary for each list) and send the summaries to designated recipients.

Figure 1:
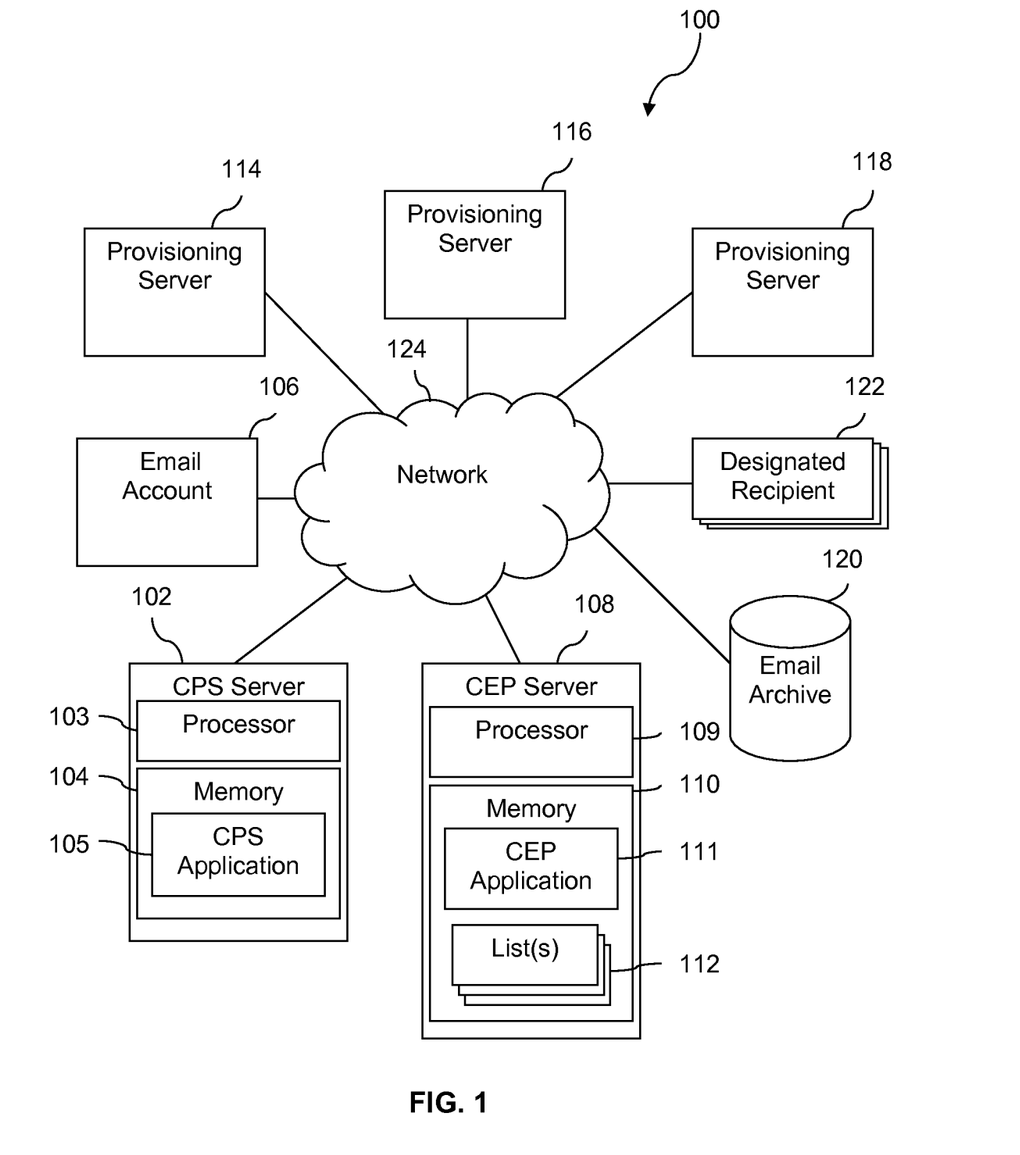
FIG. 1 is a block diagram of a system according to an embodiment of the disclosure.

Turning now to FIG. 1, a communication system 100 is described. The system 100 comprises a centralized provisioning system (CPS) server 102. In an embodiment, the CPS server 102 may comprise a processor 103, a memory 104, and a CPS application 105 stored in the memory 104. The system 100 further comprises an email account 106. The system 100 further comprises a CPS email process (CEP) server 108. In an embodiment, the CEP server 108 further comprises a processor 109 and a memory 110. The memory 110 of the CEP server 108 further comprises a CEP application 111 and a plurality of lists 112. The system 100 further comprises a plurality of provisioning servers 114, 116, 118. The system 100 further comprises an email archive data store 120. The system 100 further comprises a plurality of designated recipients 122 and a network 124. In an embodiment, the CPS server 102, the email account 106, the CEP server 108, the provisioning servers 114, 116, 118, the email archive data store 120, and the plurality of designated recipients 122 may be communicatively coupled to the network 124. In an embodiment, the designated recipients 122 may be communicatively coupled to the network 124 via a plurality of personal computers or mobile communication devices. In an embodiment, the network 124 may be a private communication network, a public communication network, or a combination thereof.

In an embodiment, the CPS application 105 of the CPS server 102 monitors the plurality of provisioning servers 114, 116, 118. While three provisioning servers 114, 116, 118 are illustrated in FIG. 1, there may be more provisioning servers executing within the system 100. In an embodiment, the CPS application 105 receives emails from the plurality of provisioning servers 114, 116, 118. In an embodiment, the emails received by the CPS application 105 may comprise one or more of status emails, information emails, notification emails, log emails, alarm emails, alert emails, or some other kinds of emails. The emails comprise a subject, a time stamp, and a source of the email (e.g., an identity of a provisioning server or other server. Status emails may report general status information about the servers 114, 116, 118 or about the applications executing thereon. Status, information emails, and/or log emails may not be considered to report any unexpected or abnormal event or to trigger an intervention by a technician or administrator. Under some conditions, log emails may contain nearly any kind of information—both neutral status information and error or impending fault information. By contrast, an alert email and/or an alarm email may report an anomalous state or operation condition of impending failure, error, or other conditions that may call for an unplanned or unscheduled intervention by a technician or administrator. For example, a status email may be an email that describes the amount of memory available to the provisioning servers 114, 116, 118. Using a related example, an alert email may be sent by the provisioning servers 114, 116, 118 to the CPS application 105 if the amount of memory usage for the provisioning servers 114, 116, 118 exceeds a predefined threshold. It is understood that the emails sent by the provisioning servers 114, 116, 118 may be characterized and/or categorized in a variety of ways (to some extent, the description, characterization, and/or categorization of emails into types of emails may be arbitrary and may vary from one implementation to another) and may include information emails, notifications or notification emails, alarms or alarm emails, errors or error emails, logs or log emails, and the like. The present disclosure contemplates that any of these types and/or categories of emails may be processed by the system 100.

In an embodiment, the CPS application 105 sends the emails that it receives from the provisioning servers 114, 116, 118 to the email account 106. Prior the implementation of the system 100, the emails would be sent directly to designated recipients 122 which could prove problematic as there may be hundreds if not thousands of emails depending on how many servers are sending emails to the email account 106. In an embodiment, the CEP application 111 of the CEP server 108 accesses the emails in the email account 106, analyzes the emails, and transfers the emails from the email account 106 to the plurality of lists 112. In an embodiment, the CEP application 111 may access the emails in the email account 106 periodically. In an embodiment, the lists 112 that the CEP application 111 transfers the emails to may be categorized in part by what server the emails come from, the subject of the emails or a keyword search selection. In an embodiment, the keyword search selection may be used by the CEP application 111 to parse the emails to search for a high severity status. In an embodiment, the emails may also be transferred to the plurality of lists 112 based in part on the high severity status. In an embodiment, a high severity status may be associated with predefined issues that a company may wish to address more quickly than other issues, e. g., high memory usage on the plurality of servers 114, 116, 118, etc.

In an embodiment, the CEP application 111 may generate a separate summary for each of the lists 112 based on the emails that the lists comprise. The CEP application 111 may send the summary emails to the plurality of designated recipients 122 where if there are any issues that occur, they may be addressed accordingly. After the summary emails are sent to the designated recipients 122, the emails may be removed from the lists 112 by the CEP application 111 and stored onto the email archive data store 120. After a period of seven days or some other predefined period of time, the emails in the email archive data store 120 may be deleted.

In an embodiment, the CPS application 105 is executed by the processor 103 of the CPS server 102. The CPS application 105 may receive emails from the plurality of provisioning servers 114, 116, 118. In an embodiment, the emails may be status emails, alert emails, or other kinds of emails. For example, a status email may be sent by the provisioning server 114 describing the amount of memory that is available to the provisioning server 114. An alert email may be sent by the provisioning server 114 when the memory usage of the provisioning server 114 exceeds a predefined threshold. The CPS application 105 may transfer the emails that it receives to the email account 106. In an embodiment, the email account 106 may be a group email account that is accessible from other servers and the CEP server 108.

In an embodiment, the CEP application 111 is executed by the processor 109 of the CEP server 108. The CEP application 111 may access the emails in the email account 106. In an embodiment, the CEP application 111 may access the email account 106 periodically. The CEP application 111 may access the email account 106 about every five minutes or some other interval of time. The CEP application 111 may analyze, parse, and then transfer the emails into the plurality of lists 112. In an embodiment, the CEP application 111 may transfer the emails to the plurality of lists 112 based in part on which server of the plurality of provisioning servers 114, 116, 118 that the emails come from. The CEP application 111 may transfer the emails to the plurality of lists 112 based in part on the subject of the emails. For example, a subject may be titled "memory usage above ninety percent of capacity." The subject lines of the emails autogenerated by the servers 114, 116, 118 may be restricted to a relatively small number of enumerated different subjects, thereby promoting deterministic sorting and/or distribution of emails to the lists 112. Alternatively, the subject lines of the emails autogenerated by the servers 114, 116, 118 may contain, along with other information and/or text, keywords restricted to a relatively small number of enumerated key words, the restriction of keywords thereby promoting deterministic sorting and/or distribution of emails to the lists 112.

The CEP application 111 may transfer the emails to the plurality of lists 112 based in part on a keyword search selection. The CEP application 111 may utilize the keyword search selection so as to parse the emails to search for a high severity status. The CEP application 111 may also transfer the emails in the email account 106 based in part on the high severity status. A high severity status may comprise a set of predefined issues or errors that a company may wish to address promptly.

The CEP application 111 may then process each of the emails on the lists 112 and build a corresponding summary email based on the emails. For example, the CEP application 111 may process a first list 112 and build a corresponding first summary email based on the emails stored in or on the first list 112; the CEP application 111 may process a second list 112 and build a corresponding second summary email based on the emails stored in or on the second list 112; the CEP application 111 may process a third list 112 and build a corresponding third summary email based on the emails store in or on the third list 112; and so on building a separate summary email for all of the emails stored in or on each separate list 112.

In an embodiment, the CEP application 111 may access the emails in the email account 106 and generate the summary emails periodically. In an embodiment, the CEP application 111 may access the emails and generate the summary emails about every five minutes, about every ten minutes, about every fifteen minutes, about every sixty minutes, or some other interval of time. In an embodiment, each summary email may identify the number of emails stored on or in the list 112 it is associated with, a subject and/or keyword that the summary email is based on, a severity of the subject, a time stamp value or a range of time stamp values associated with the emails, and/or a thread location amongst the plurality of provisioning servers 114, 116, 118. The summary email may have one line for each email on the list 112. The line for each email may comprise a link to the full email, so a designated recipient may use the link contained in any of these lines to access and read the full email.

In an embodiment, the emails stored in or on a list 112 may be sorted into a plurality of different sub-categories, and the summary email may have a separate line that captures information about the emails of each of the different sub-categories of emails in or on the list 112. For example, a first list may comprise emails associated with a first main subject. These emails may be further associated with three different sub-categories. The first list may comprise 1000 emails: 500 emails related to a first sub-category, 300 emails related to as second sub-category, and 200 emails related to a third sub-category. The summary email, accordingly, may have a first line indicating that 1000 emails are on the list 112 and indicating a time stamp or time stamp range, a second line indicating that 500 emails relating to the first sub-category are on the list, a third line indicating that 300 emails relating to the second sub-category are on the list, a fourth line indicating that 200 emails relating to the third sub-category are on the list, and 1000 lines each providing information about one of the emails on the list.

It is understood that a wide variety of formats and contents of the summary email are contemplated by the present disclosure. In an embodiment, a designated recipient, for example a system administrator responsible for maintaining some of the servers 114, 116, 118 may open a summary email and by reading the first line develop a quick idea of the condition of the servers 114, 116, 118. The designated recipient can quickly determine if a small number of emails have been generated in the subject periodic time interval or a large number. A large number of emails may immediately suggest to the designated recipient that immediate action on his or her part is appropriate. The subject or keyword associated with that summary may further suggest quickly to the designated recipient what may be the trouble, if there is trouble. If the designated recipient wants to look at individual emails, the lines for each individual email in the summary email provide help. After the summary emails have been generated, the CEP application 111 may transfer the summary emails to the plurality of designated recipients 122 where any issues that have occurred may be addressed accordingly.

In an embodiment, the CEP application 111 may generate summary emails in several ways. For example, a company may designate the CEP application 111 to parse and transfer the emails into the plurality of lists 112 based on what server that the emails come from. If a company were to designate the CEP application 111 to parse the emails in this manner, the summary email may have several different ways it could be organized. For example, if the CEP application 111 were to receive one hundred emails from provisioning server 114 and determine that there are three subjects with one subject comprising ninety of the emails, a second subject comprising five of the emails, and a third subject comprising the other five emails, the CEP application 111 may be able to generate the summary email to list the emails one-by-one, but also separate the emails by subject with lines of demarcation to denote where a subject change occurs. The summary emails may also provide three, one line summaries of each subject near the top of email.

In an embodiment, after the summary emails have been sent to the designated recipients 122, the CEP application 111 may remove the emails from the lists 112. After the emails have been removed from the lists 112, the emails may be transferred to the email archive data store 120. In an embodiment, the emails in the email archive data store 120 may be deleted after a period of a day, seven days, a month, a quarter, a year, or some other predefined period of time so as to maintain a sustainable amount of memory use.

Figure 2:
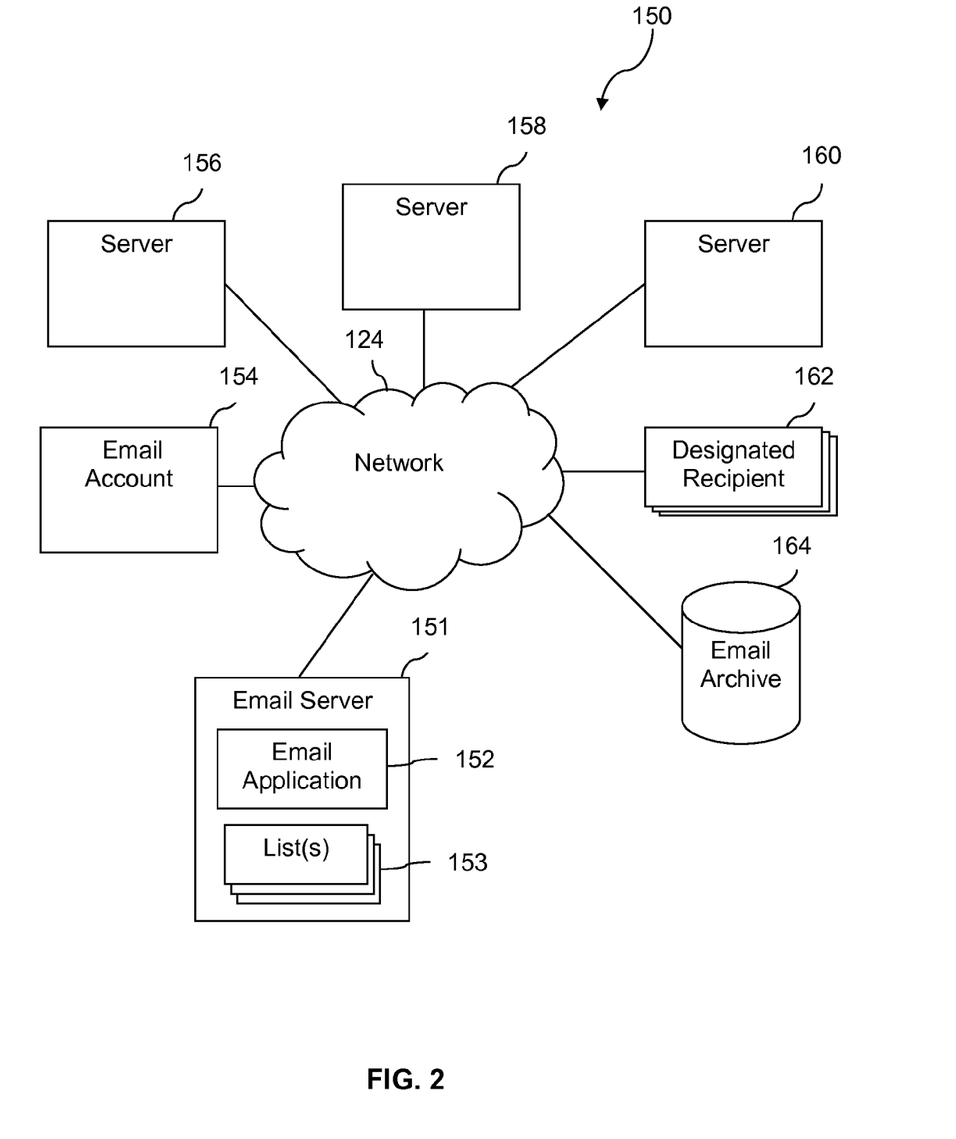
FIG. 2 is a block diagram of a system according to an embodiment of the disclosure.

In FIG. 2, a system 150 is described. The system 150 comprises an email server 151 which further comprises an email application 152 and a plurality of lists 153. The email server 151, the email application 152 and the plurality of lists 153 may be implemented in a similar fashion as the CEP server 108 and its components as previously illustrated and described in FIG. 1. The system 150 further comprises an email account 154, a plurality of servers 156, 158, 160, a plurality of designated recipients and/or employees 162, and an email archive data store 164. The servers 156, 158, 160 may be any kind of servers that may send emails to the email account 154. For example, the servers 156, 158, 160 may send one or more of status emails, information emails, notification emails, log emails, alarm emails, and/or alert emails.

The email application 152 when executed by a processor of the email server 151 may access and transfer the emails in the email account 154 to the plurality of lists 153 based on criteria such as subjects and/or keywords, as described further above with reference to FIG. 1. The email application 152 may analyze the emails on each of the lists 153 and generate a summary for each list 153 based on the analysis. The email application 152 may access the email account 154 and generate the summary emails periodically. After the email application 152 generates the summary emails for each list 153, the email application 152 sends the summary emails to the plurality of responsible designated recipients and/or employees 162. After the summary emails have been sent to the plurality of designated recipients and/or employees 162, the email application 152 removes the emails in the plurality of lists 153 and stores them to the email archive data store 164. After a predefined period of time the emails in the email archive data store 164 may be deleted and/or transferred to long term storage.

Figure 3:
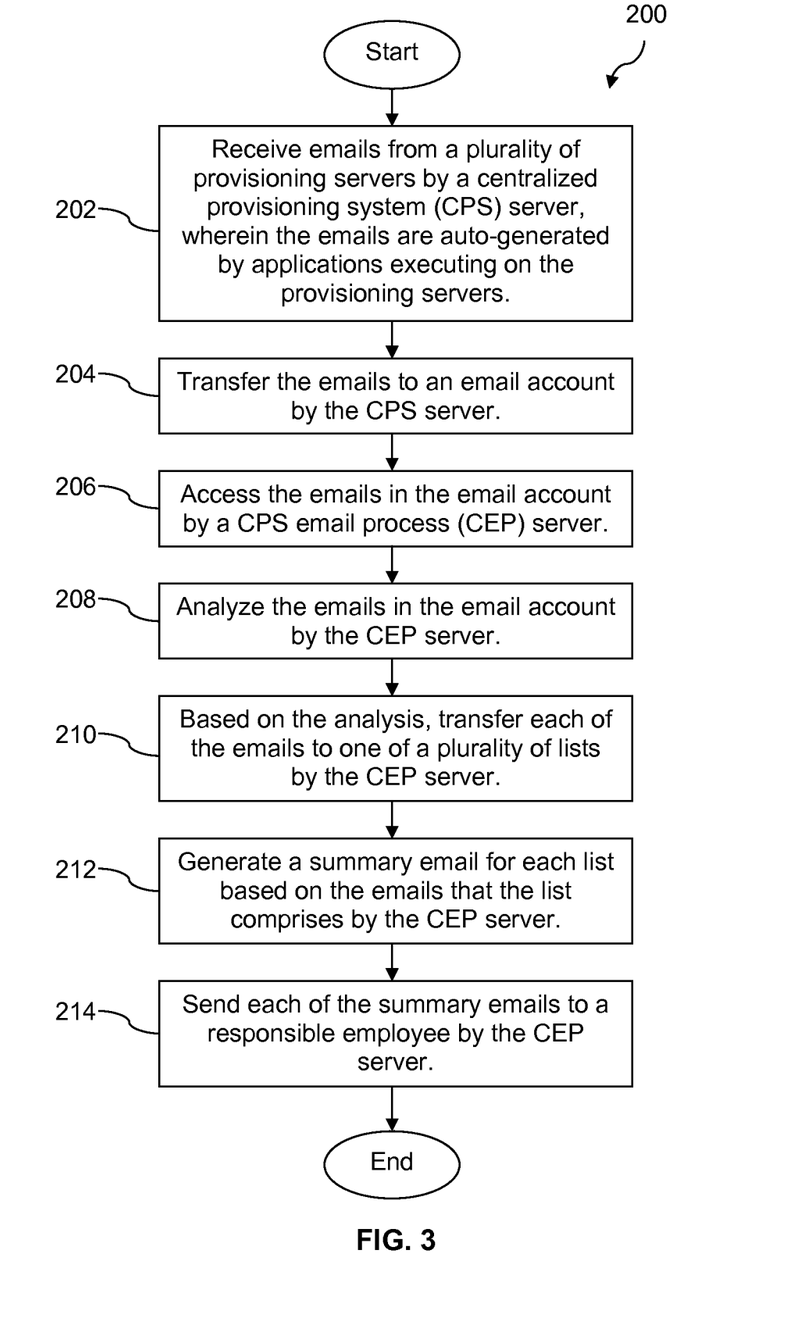
FIG. 3 is a flow chart of a method according to an embodiment of the disclosure.

In FIG. 3, a method 200 is described. At block 202, a centralized provisioning system (CPS) server receives emails from a plurality of provisioning servers, wherein the emails are auto-generated by applications executing on the provisioning servers. At block 204, the CPS server transfers the emails to an email account, for example to a single email account. At block 206, a CPS email process (CEP) server accesses the emails in the email account. At block 208, the CEP server analyzes the emails accessed in the email account. At block 210, based on the analysis, the CEP server transfers each of the emails from the email account to one of a plurality of lists. For example, the CEP server transfers a first email to a first list, a second email to a second list, a third email to the first list, a fourth email to a third list, etc. At block 212, the CEP server generates a summary email for each list based on the emails that the list comprises. At block 214, the CEP server sends the summary emails to a designated recipient.

Figure 4:
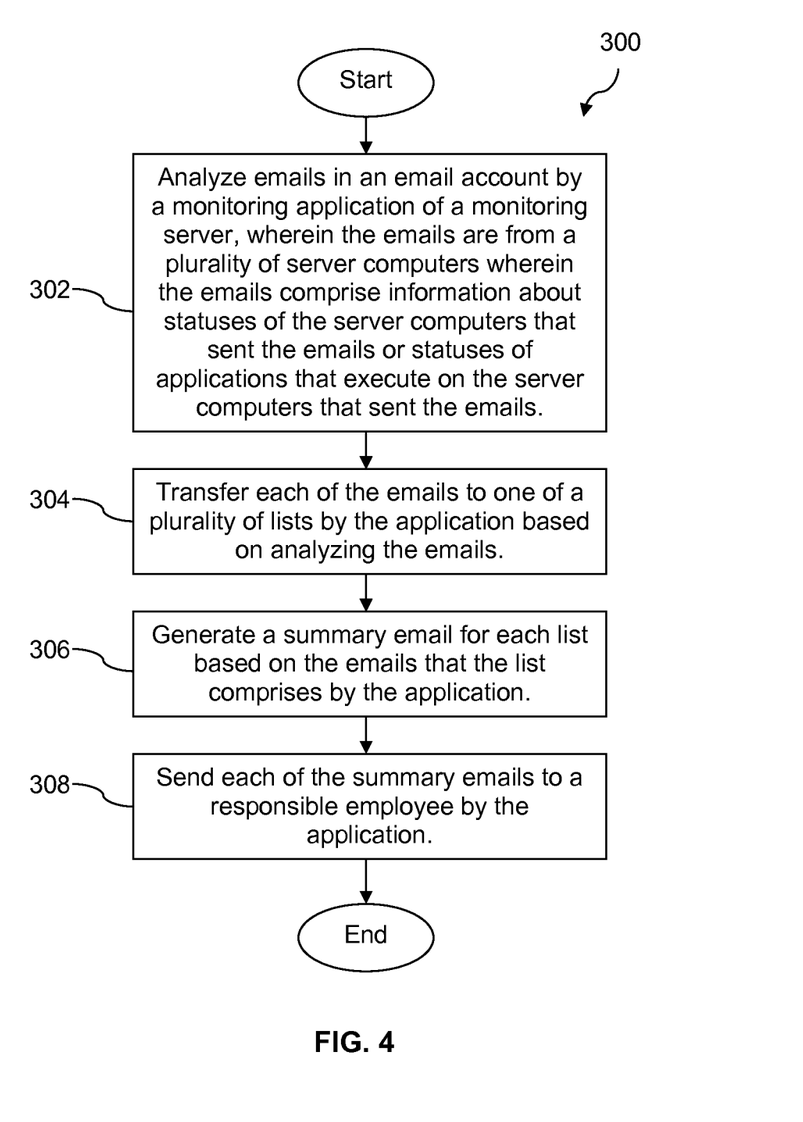
FIG. 4 is a flow chart of a method according to an embodiment of the disclosure.

In FIG. 4, a method 300 is described. At block 302, a monitoring application of a monitoring server analyzes emails in an email account, wherein the emails are created and sent from a plurality of server computers, wherein the emails comprise information about statuses of the server computers that sent the emails or statuses of applications that execute on the server computers that sent the emails. At block 304, the application transfers each of the emails to one of a plurality of lists based on the analysis of the emails. At block 306, the application generates a summary email for each list based on the emails that the list comprises. At block 308, the application sends each of the summary emails to a designated recipient.

Figure 5:
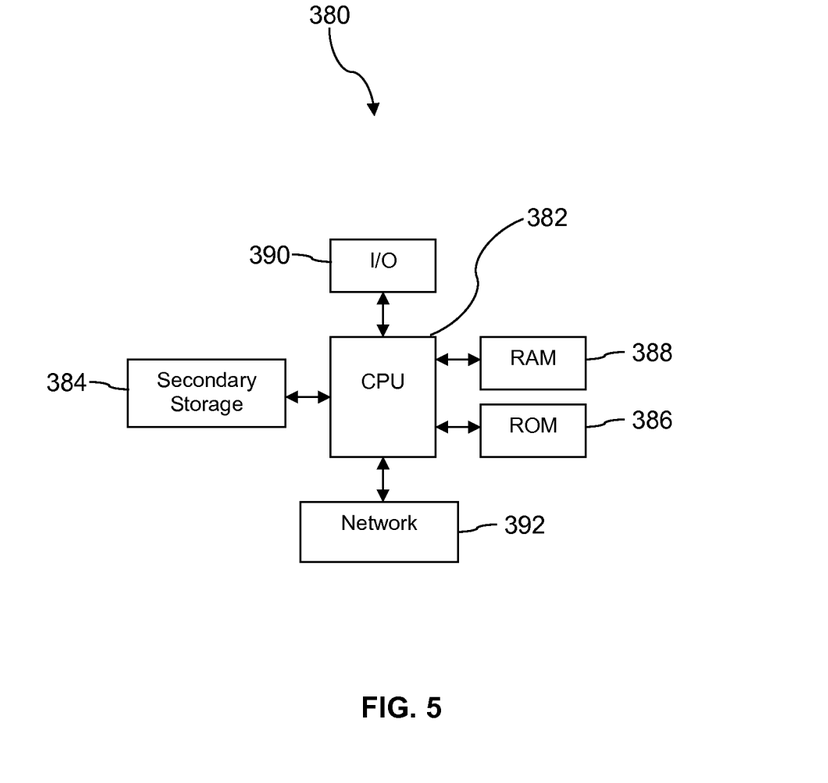
FIG. 5 illustrates an exemplary computer system suitable for implementing the several embodiments of the disclosure.

FIG. 5 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An email processing system, comprising:
   a centralized provisioning system (CPS) server, comprising:
   a processor;
   a memory;
   a CPS application stored in the memory, that when executed by the processor,
      receives emails from a plurality of provisioning servers, wherein the emails are auto-generated by applications executing on the provisioning servers, and
      transfers the emails to an email account, and
   a CPS email process (CEP) server, comprising:
   a processor;
   a memory;
   a CEP application stored in the memory, that when executed by the processor,
      accesses the emails in the email account, wherein the emails are one or more of status emails, alert emails, alarm emails, notification emails, log emails, or information emails, and wherein each email comprises a subject, a time stamp, and a source of the email,
      analyzes the emails, wherein the CEP application analyzes the subjects of the emails, the time stamps of the emails, and the source of the emails,
      based on the analysis, transfers each of the emails to one of a plurality of lists,
      generates a summary email for each list based on the emails that the list comprises,
      when a number of emails in a summary associated with a predefined subject exceeds a pre-defined threshold, commands an action be performed by a provisioning server associated with the summary, where the action is one of a reboot, an initiation of a garbage collection utility, a change of allocation of heap memory, or a change of an allowed number of network connections of the provisioning server associated with the summary, and
      sends each of the summary emails to a designated recipient.

2. The method of claim 1, wherein the CEP application accesses the emails and generates the summary emails periodically.

3. The method of claim 2, wherein the CEP application accesses the emails and generates the summary emails about every five minutes.

4. The method of claim 1, wherein the CEP application removes the emails that it accesses from the email account.

5. The method of claim 1, wherein the CEP application sends the emails that it removes from the email account to an email archive data store.

6. The method of claim 1, wherein the emails received by the CPS server from the provisioning servers are status emails or alert emails.

7. The method of claim 1, wherein the email account that the emails are transferred to is a group email account that is accessible by the CEP application.

8. A method of monitoring a plurality of servers, comprising:
  receiving emails from a plurality of provisioning servers by a centralized provisioning system (CPS) server, wherein the emails are auto-generated by applications executing on the provisioning servers;
  transferring the emails to an email account by the CPS server;
  accessing the emails in the email account by a CPS email process (CEP) server, wherein the emails are one or more of status emails, alert emails, alarm emails, notification emails, log emails, or information emails, and wherein each email comprises a subject, a time stamp, and a source of the email;
  analyzing the emails in the email account by the CEP server, wherein the CEP server analyzes the subjects of the emails, the time stamps of the emails, and the source of the emails;
  based on the analysis, transferring each of the emails to one of a plurality of lists by the CEP server;
  generating a summary email for each list based on the emails that the list comprises by the CEP server;
  when a number of emails in a summary associated with a predefined subject exceeds a pre-defined threshold, commanding, by the CEP server, that an action be performed by a provisioning server associated with the summary, where the action is one of a reboot, an initiation of a garbage collection utility, a change of allocation of heap memory, or a change of an allowed number of network connections of the provisioning server associated with the summary; and
  sending each of the summary emails to a designated recipient by the CEP server.

9. The method of claim 8, wherein the CEP server accesses the email account periodically.

10. The method of claim 9, wherein the CEP server accesses the email account about every five minutes.

11. The method of claim 8, wherein the CEP server transfers the emails to the plurality of lists based in part on the server that the emails come from.

12. The method of claim 8, wherein the CEP server transfers the emails to the plurality of lists based in part on a subject of the emails.

13. The method of claim 8, wherein the CEP server transfers the emails to the plurality of lists based in part on a keyword search selection.

14. The method of claim 13, wherein the keyword search selection parses the emails to search for a high severity status.

15. The method of claim 14, wherein the CEP server transfers the emails to the plurality of lists based in part on the high severity status.

16. A method of monitoring a plurality of server computers, comprising:
  accessing emails from a plurality of server computers in the email account by a monitoring application of a monitoring server, wherein the emails are one or more of status emails, alert emails, alarm emails, notification emails, log emails, or information emails, and wherein each email comprises a subject, a time stamp, and a source of the email;
  analyzing the emails in the email account by the monitoring application, wherein the monitoring application analyzes the subjects of the emails, the time stamps of the emails, and the source of the emails, and wherein the emails comprise information about statuses of the server computers that sent the emails or statuses of applications that execute on the server computers that sent the emails;
  transferring each of the emails to one of a plurality of lists by the monitoring application based on analyzing the emails;
  generating a summary email for each list based on the emails that the list comprises by the monitoring application;
  in response to a number of emails in a summary associated with a predefined subject exceeding a pre-defined threshold, commanding, by the monitoring application, that an action be performed by a server computer associated with the summary, where the action is one of a reboot, an initiation of a garbage collection utility, a change of allocation of heap memory, or a change of an allowed number of network connections of the server computer associated with the summary; and
  sending each of the summary emails to a designated recipient.

17. The method of claim 16, wherein the summary email identifies the number of emails that pertain to a subject that the summary email is based on, a severity of the subject, a time stamp, and a thread location.

18. The method of claim 16, further comprising sending the emails to an email archive data store.

19. The method of claim 18, further comprising deleting the emails from the email archive data store after a predefined period of time.

20. The method of claim 16, wherein analyzing emails, transferring emails to the plurality of lists, and generating the summary email for each list is done by the monitoring application about every five minutes.

* * * * *